(No Model.)
G. LAUBE.
VEHICLE WHEEL.
No. 539,522. Patented May 21, 1895.
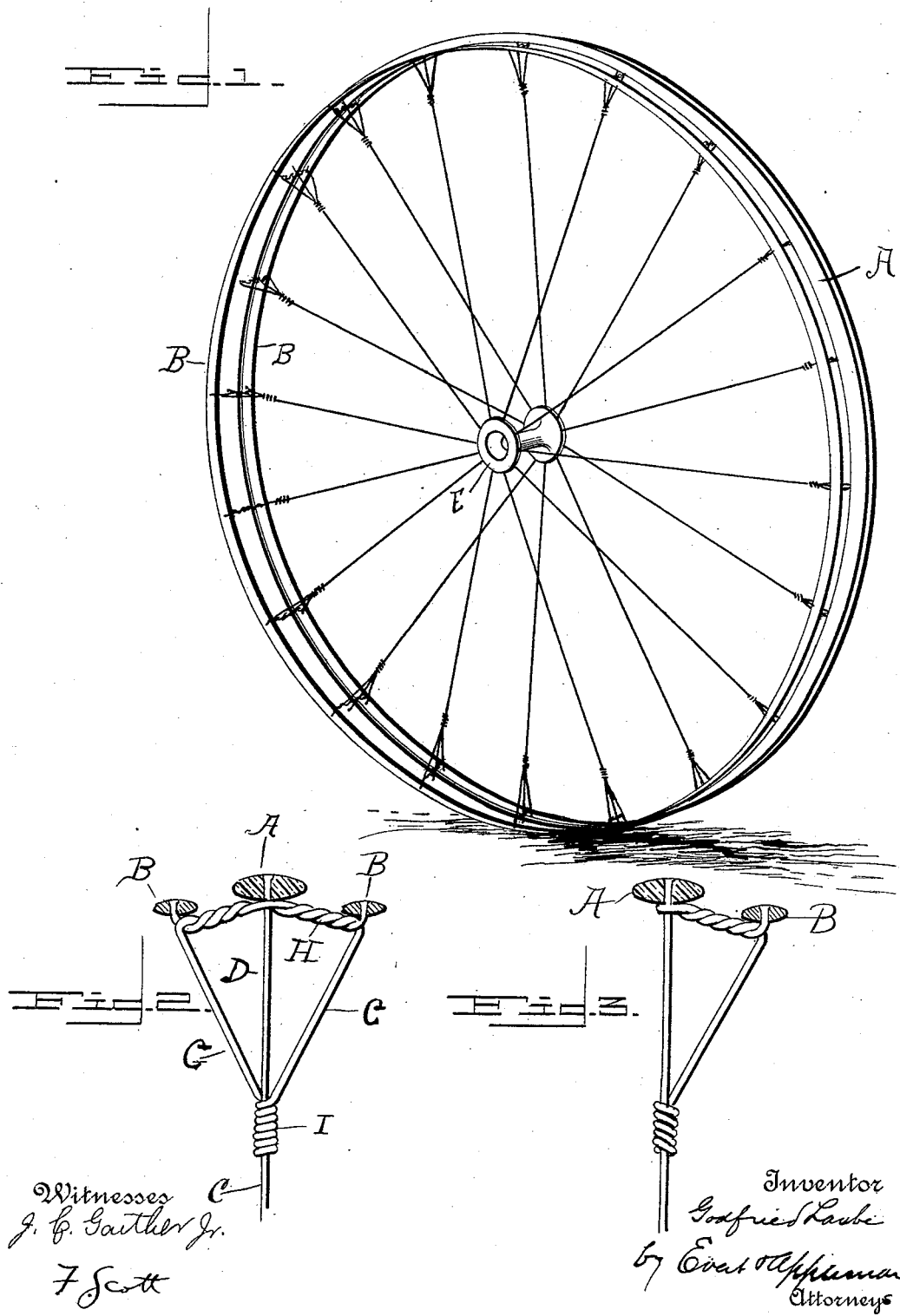
Witnesses
J. C. Gaither Jr.
F. Scott
Inventor
Godfried Laube
by Evat Appleman
Attorneys

UNITED STATES PATENT OFFICE.

GODFRIED LAUBE, OF HURON, SOUTH DAKOTA, ASSIGNOR OF ONE-HALF TO JOSEPH HYMANS, OF DEL RIO, TEXAS.

VEHICLE-WHEEL.

SPECIFICATION forming part of Letters Patent No. 539,522, dated May 21, 1895.

Application filed March 24, 1894. Serial No. 504,909. (No model.)

*To all whom it may concern:*

Be it known that I, GODFRIED LAUBE, a citizen of the United States of America, residing at Huron, in the county of Beadle and State of South Dakota, have invented certain new and useful Improvements in Vehicle-Wheels, of which the following is a specification, reference being had to the accompanying drawings.

This invention relates to certain new and useful improvements in vehicle wheels and is particularly adapted and designed to be employed in connection with light vehicles.

The object of the invention is to provide novel means whereby the wheel will be prevented from slipping into ruts in the road, thus overcoming the jar that would otherwise be caused; furthermore, to construct a wheel of this class that will be strong, durable and comparatively inexpensive to manufacture.

With the above and other objects in view the invention consists in the peculiar construction and arrangement of the fellies and spokes to be hereinafter more particularly described and specifically referred to in the claim.

In describing the invention in detail, reference is had to the accompanying drawings, forming part of this specification, and wherein like letters of reference refer to similar parts throughout the several views, in which—

Figure 1 is a view in perspective, showing my invention applied to the wheel. Fig. 2 is a detail view of the section of the felly. Fig. 3 is a similar view of a modified form of spoke.

In the drawings, A illustrates the main and center felly; B B, the auxiliary fellies arranged on each side of the felly A.

C, represents the double wired twist spoke having a main and center support D which enters the hub "E" and main felly A.

Near the top of the support D is arranged a triangular brace F consisting of V shaped side supports G, G, and a horizontal connecting brace H. The said braces G, G, are twisted in the shape of a spiral around the main support as shown at "I."

It will be noted that the main felly is the only one that ordinarily touches the ground unless the wheels enter a rut when the side or auxiliary fellies are called into service and the vehicle supported thereby. The side brace also acts as a guard in case the rut is a narrow one.

The wheel may be made of any suitable material, but the spokes are preferably constructed of heavy wire, and the object is to manufacture the wheel in such a manner that will not add additional weight to the vehicle.

The invention is particularly applicable to children's carriages yet it may be employed to a great advantage to all classes of light vehicles.

Particular attention is called to the fact that the triple fellies may be arranged in various ways, and I therefore do not wish to limit myself to the specific construction of the invention as shown and described.

Having fully described my invention, what I claim as new, and desire to secure by Letters Patent, is—

In a triple felly wheel, the combination of the main and central felly having arranged on each side thereof fellies having a less diameter than the main felly and supported by a spoke consisting of a central support and a triangular brace having its free ends twisted spirally around the main brace substantially as specified and for the purpose herein set forth.

In testimony whereof I affix my signature in presence of two witnesses.

GODFRIED LAUBE.

Witnesses:
 ANNIE T. LAUBE,
 HATTIE ROSE LAUBE.